United States Patent [19]

Bullerdieck

[11] 4,085,963
[45] Apr. 25, 1978

[54] SAFETY SEAT FOR VEHICLES

[76] Inventor: Heinz H. Bullerdieck, Friederickh-Ebert-Str. 41, D-3500 Kassel, Germany

[21] Appl. No.: 635,510

[22] Filed: Nov. 26, 1975

[30] Foreign Application Priority Data

Nov. 27, 1974 Germany .............................. 2456028

[51] Int. Cl.² ............................................ B60R 21/10
[52] U.S. Cl. .............................. 296/65 A; 180/103 A; 297/216
[58] Field of Search ............................ 296/35 B, 65 A; 180/82 R; 297/216; 180/103 A

[56] References Cited

FOREIGN PATENT DOCUMENTS 2,016,701  10/1971  Germany .............................. 297/216
2,144,702  3/1973  Germany .............................. 297/216

*Primary Examiner*—Joseph F. Peters, Jr.
*Assistant Examiner*—John A. Pekar
*Attorney, Agent, or Firm*—Fred Philpitt

[57] ABSTRACT

An integrally formed safety seat for vehicles, in particular passenger cars, including a seat-supporting base adapted to be displaced longitudinally along the vehicle bottom, a back pivotably attached to the seat, a headrest as well as a safety belt with a retarding device, comprising structure for pivoting both the entire seat and the occupant belt-fastened thereto around an axis that is situated either essentially transversal or at some acute angle to the longitudinal vehicle direction approximately above the seat center near the level of the back end or of the headrest, whereby the entire seat is adapted to be moved upwardly, forwardly and laterally on upwardly concave two-plate bearings with which driving and braking mechanisms are associated for respectively pushing and retarding said seat to its safety position in which it is pivoted substantially towards a collision point, said two-plate bearings being displaceably attached to each other in such a way that their relative movement is possible only through a control preferably responding to a predetermined deceleration value, said braking mechanism comprising deformable sections of at least one of said concave plate bearings.

9 Claims, 10 Drawing Figures

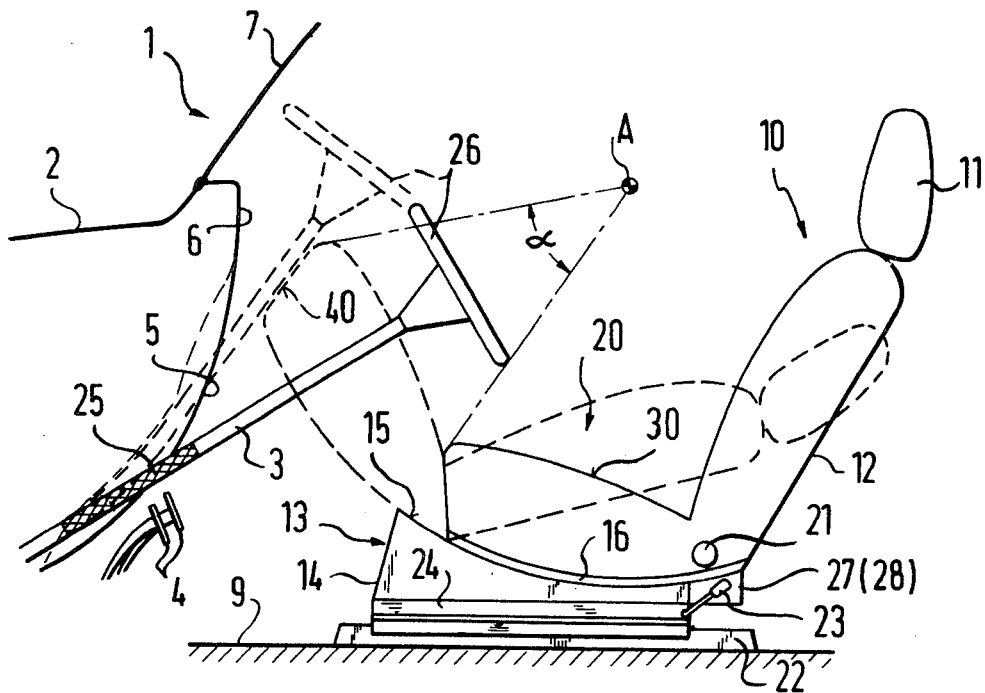

SAFETY SEAT FOR VEHICLES

FIELD OF THE INVENTION

The present invention relates to a safety seat system for vehicles and more particularly for automobiles.

BACKGROUND OF THE INVENTION

In recent times, efforts have been increased to provide more safety for the inmates of vehicles. Numerous detailed investigations have been carried out in this respect in order to ascertain the conditions prevailing during collisions. Due to the findings thus obtained, a general reassessment of the facts and their application has led to a number of ameliorations such as the use of overall bumpers and crusher zones, the provision of more survival space, of rigid passenger compartments, of intravehicular obtuseness (= smooth interior), of splinter-proof glass, etc. The seats, too, were designed not only for maximum comfort but also for functional ease and operational stability. Further seat requirements include proper elasticity, vibration absorption, good aeration as well as sufficient heat retention and the occupant's freedom of motion despite the use of seat belts and moulded retaining rims.

In order to keep a person from being moved inside a crashing vehicle when the latter is coming to a standstill, this person must be firmly connected to the vehicle so as to be virtually a part thereof. Although the conventional belt does enforce the belt-fastened occupant's participation at the deceleration of the vehicle during an energy absorbing crash, there are certain limitations that still constitute safety hazards. For example, a sudden braking manoeuver may cause the shoulder strap or its attachment means to rapidly deteriorate even under moderate forces, as these are multiplied when the person's body presses heavily forward in a collision. Passive structures comprising belts that will automatically embrace any person who sits down in the car require reinforced fixing points at the respective doors and a tightening device for each seat, with the tightening and gappling of the belts being controlled through inertia-operated sensors.

It has been attempted to protect vehicle passengers be seats that will tilt from the normal fairly upright position into a reclined safety position upon violent deceleration of the vehicle. The known mechanisms for achieving this include relatively complicated lever systems and/or racks with linear or arcuate guide tracks fixed by the sides of a seat the bottom of which may thus move forwardly and upwardly in case of a crash, while its back may tilt backwardly. Where such pivoting movements may be freely brought about, they will be just as liberally cancelled by opposing accelerations so that the sitting person is thrown to and fro, e.g., with any stop and start under normal traffic conditions. Moreover, the conventional tilting systems depend solely on the force of braking or of crash inertia for causing the tilting motion which, therefore, may be far too late for adequate protection of the passenger even where he or she is, theoretically, the one to trigger a linkage for tilting prior to an impending collision. Worst of all, however, the pivoting movement of any such conventional seats is restrained to the longitudinal vehicle direction only, though it is a statistically established fact that straight head-on collisions are far less frequent than crashes involving at least one or the other of the vehicle corners. Consequently, not only will a conventional tilting seat — even if it be pivoted in time — offer insufficient protection due to the divergence between the collision direction and the line of the seat motion, but there will also be a considerable risk of clamping and jamming when the seat guide mechanism is subjected to lateral forces and torques, impeding or even preventing the vital reclining movement at the most critical time.

OBJECTS OF THE INVENTION

It is an important object of the invention to overcome the drawbacks of the prior art and to assist in vehicle safety developments by creating an improved seat system adapted to safeguard the vehicle occupants during collisions or other accidents well within the very short lapse of time available.

Another object of the invention consists of providing a seat system that will move the respective occupant rapidly into a position wherein his or her body is anatomically well fitted to resist outside forces even though these may not coincide with the longitudinal vehicle direction.

A further object of the invention is to provide an improved seat system adapted to actively respond to vehicle decelerations exceeding a predetermined threshold value only.

It is a still further object of the invention to bring about a seat system enabling the occupant to selectively operate a reclining mechanism or to choose the latter's automatic response in case of a crash or other drastic deceleration.

Yet another object of the invention is the provision of a novel safety seat system of relatively simple and rugged design so that it may be produced with tolerably little constructional effort and may be relied upon to work efficiently in any emergency situation.

SUMMARY OF THE INVENTION

The invention provides an integrally formed safety seat for vehicles, in particular passenger cars, including a seat-supporting base adapted to be displaced longitudinally along the vehicle bottom, a back pivotably attached to the seat, a headrest as well as a safety belt with a retarding device, comprising means for pivoting both the entire seat and the occupant belt-fastened thereto around an axis that is situated either essentially transversal or at an acute angle to the longitudinal vehicle direction approximately above the seat center near the level of the back end or of the headrest, whereby the entire seat is adapted to be moved upwardly, forwardly and laterally on upwardly concave two-plate bearing means with which driving and braking means are associated for respectively pushing and retarding said seat to its safety position in which it is pivoted substantially towards a collision point.

Thus the invention creates in a highly economical way a tiltable seat warranting full comfort as well as optimum safety due to biomechanical relief in any hazardous situation. As the integrally formed seat is supported in a cup-type or sole bearing, it is most stable and can be moved only (in the direction of collision) when associated control means have been actuated and in particular when a preset deceleration threshold has been exceeded. If, therefore, a sudden stop initiates the quick tilting motion of the seat and the person belt-fastened to it, his or her thighs will be pressed onto the reclined seat bottom while his or her trunk and head, respectively, will be cushioned by the seat back and the headrest in an overall orientation pointing to the location of travel obstruction. This motion does require some space within the compartment, it is true, but there is usually enough room available or easily provided at least in larger vehicles, in two-seat cars or the like. The lateral degree of freedom of the two-plate sole bearing also makes allowance for the fact that straight head-on collisions are scarcer than corner-involved crashes; in the laterally tilted seat, the occupant is cradled by the rim fenders at the seat sides.

In a preferred embodiment, said base includes a support having, at its upper side, an upwardly concave arched smooth-faced sliding plate for receiving a matchingly arched smooth-faced sliding block that carriers said seat bottom and that is displaceably attached to said sliding plate such that said sliding block may move relative to said support sliding plate only upon actuation of a pivoting control. Such a structure may be manufactured without difficulty. It will retain the merits of conventional seat systems but excel as regard utility and light weight, since joints and linkages (customarily restraining seat tilting motions to a single pivoting plane) may be dispensed with. Rather, the invention contemplates the use of arched sliding plates of substantially spherical or elliptical shape, having at least approximately circular or ellipitical cross-sections. They may include a curved segment with a downwardly pointing crown, said arched sliding plate bearing the matching sliding block with a central support being adapted to have a flat extension for carrying said seat. Owing to the crowned shape, the sliding block will freely glide on the supporting plate once the deceleration threshold is exceeded.

Stops at both ends of said arched sliding plate may be provided for limiting the pivoting angle of the seat to within 70°, preferably within 45°. Such limitation is useful in that the reclined inmate will be in a position to retain his or her perspective on the traffic events while there is full protection of the almost lying body against crash forces of a wide variety.

An important feature of the invention includes braking means comprising deformable sections of at least one of said concave plate bearing means for progressive energy absorption towards the end of the seat pivoting motion. If, for instance, at least one of the arched sliding support parts is provided with narrowing, straightening or counterbending portions near its fore-part, a forced deformation thereof is inevitable during the tilting of the seat so that its occupant, too, wil experience an additional deceleration.

Another embodiment of the invention consists of limiting means for internally holding said sliding block as well as any support parts attached thereto within the arched sliding plate which may comprise an aperture for the purpose. Preferably, said aperture is passed by said central support and is radially smaller than said sliding block so as to captivate it securely. Further, if said aperture is generally pear-shaped to provide a distended recess toward the frontside end of said flat extension, the sliding block may assume any number of positions up to the bounds of said aperture.

According to the invention, drive means may be associated to the movable seat portions and may be backed up by stationary vehicle parts, locking means being coupled to said drive means in such manner that the latter will be operative only when said locking means have been released by actuation of said pivoting control. Such locking means may comprise a forcibly destructible device including at least one rated break point. While the locking means will arrest the two-plate sole bearing of the seat in any normal situation, their release will be effected upon excess of a predetermined vehicle deceleration and the drive means will be activated to additionally pivot the seat. As a result, decisive fractions of a second will be gained for shifting the seat as well as the person belt-fastened thereto prior to the standstill of the vehicle.

In this connection it will be remembered that for stopping a man seated in a crashing vehicle, only an extremely short interval is available. For this reason, it is of paramount importance to rapidly trigger the tilting motion and to complete it immediately in order to biomechanically relieve the man's body by instantaneously positioning him or her as nearly as possible along the line of collision. Thus almost lying at rest, he or she will be less vulnerable and be able to withstand higher loads than in any other conventional seat position. Due to the controlled drive, the seat system of the invention will most simply pivot to the safety position at top speed, safe-guarding the passenger by deliberate tilting acceleration at the critical moment.

According to another embodiment of the invention, a control device — such as a gimbal-mounted variable detent pendulum — may be provided for sudden release of said drive means or of said locking means at vehicle decelerations exceeding a predetermined threshold value, e.g., in the range of 5 to 15 meters per squaresecond and by all means above a threshold limit governing belt tightening devices that cooperate with the seat. When a crash occurs, the occupant's belt is stretched tight first as the tensioning device is activated beyond the last-mentioned threshold limit, and with deceleration then increasing, the drive means will be released for split-second action to tilt the safety seat.

A suitable control device may include inertia-operated sensor means provided with detent means. Advantageously, an electrically or magnetically conductive ball may be loosely borne by said detent means — a series of which may be staggered approximately in the longitudinal vehicle direction — such that it will be moved by inertia forces in a direction other than the gravity direction, making or beaking contacts which may be conductively connected to an ignition switch for starting said drive means.

It is to be emphasized that said drive means may involve any sort of mechanical, hydraulic, pneumatic or electrodynamic power source which, in accordance with the invention, will permit imparting said top-speed tilting motion to both the seat and the person fastened to it, and which will also supply the energy to be increasingly absorbed by the deforming structural elements. Preferably, the drive means are supported by a backing-up device rigidly connected to said base, to said seat support or to said plate bearing means. A most expedient design of the invention comprises an armoured fixture — e.g., in said base — for a charge of explosives in at least one cartridge to be ignited by said inertia-operated contacts so as to exert a strong thrust to said sliding block for moving the seat into its safety position as quickly as ever possible without, of course, endangering the vehicle inmates.

Further in accordance with the invention, control means that are either manually or automatically operative may be coupled to the closing device of an adjacent door or to said belt fastening device for the occupant, said control means governing said drive means so as to pivot said seat into its safety position. Thus the respective person may select to have himself or herself tilting either automatically in case of an accident or right at the outset as soon as the door is closed or the belt fastened, cooperating door sensors or belt controls acting to release the drive means for the purpose. A belt tightener may be associated to said belt fastening means, and a belt take-off may be arranged in the seat, preferably in its upper back, along with a belt retarding device and/or with said release means. Consequently, the tilting motion of the seat will be initiated immediately after the belt is properly tightened or when said deceleration threshold has been exceeded.

Still another embodiment of the invention includes the front edge of the seat being structurally designed for deforming impacts on the steering column when said seat is forcibly pivoted. Towards the final tilting position, the seat will thus be gradually stopped by hitting the steering column and bending it upwardly, clearing the room near the occupant's legs and feet which will be protected additionally by a deep padding of universally elastic material such as laminated foamed plastics at the vehicle body sections extending below the dashboard. Furthermore, a hollow cushioning body, e.g., made of expanded metal, may be arranged underneath the seat bottom for additional safety, as such a body will be plastically deformed during forced deceleration and absorb energy in the final stage thereof, contributing to preventing or least mitigating injuries.

It is a basic idea of the invention to positively secure the seat on a concave two-plate bearing which, in turn, may be adapted to be forcibly moved against some progressive resistance means. The base and/or the support of said plate bearing may be likewise fixed to the vehicle bottom so as to be shifted in a direction parallel thereto in case of an accident. The mounting means may include a spring-borne thrust piece and an inertia-operated control element such as a pendulum for changing the engaging pressure and/or the minimum spacing between the frictionally coupled sole plate sections when an inertia force becomes effective in a direction transverse to the gravity direction. The plates may be returned to their original position relative to each other by adjusting the control element accordingly, whereupon the latter may be refastened for securing the plates in their normal position. It will be realized that within the scope of the invention, static friction — if properly rated by suitable contact pressure, surface finishing, choice of materials, etc. — may suffice to retain the seat in its normal position, but may be overcome at a predetermined threshold of deceleration.

Still another embodiment provides at least one locking device for variably restraining said drive means and/or said plate bearing, the locking device being adapted to clear a recess so as to remain, free of friction, either outside the plate bearing or within a groove. Preferably the locking device will include a number of balls juttingly imbedded within the grooved plate bearing means.

The system of the invention will be useful for vehicles of various types. A preferred application will be in automobiles and more particularly at the front seats thereof, although it is equally possible to provide tiltable rear seats, care being taken to mount additional paddings at the rear side of the upper ends of the front seats as well as the neck-rests. Great advantages will also be obtained by applying the tilting seat system in busses, airplanes, hovercrafts, etc. At any rate, the seat system of the invention is designed for maximum biomechanical relief of the sitting person in case of a vehicle impact or drastic deceleration beyond the given threshold; even where the seat is already mounted in a reclined position, the tilting angle may well reach 45°, with the pivoting motion always as close as possible to the collision "axis" or line of impact.

BRIEF FIGURE DESCRIPTION

Further objects, features and advantages of the invention appear from the following detailed description given below, taken in connection with the accompanying drawings which form part of this specification and which illustrate, by way of nonlimiting examples, preferred embodiments of the invention. In the drawings:

FIG. 6b is a bottom view of another sliding device similar to FIG. 6a,

FIG. 7 is a sectional view taken along lines VII—VII in FIG. 6a,

DETAILED SPECIFICATION

Figure 1:
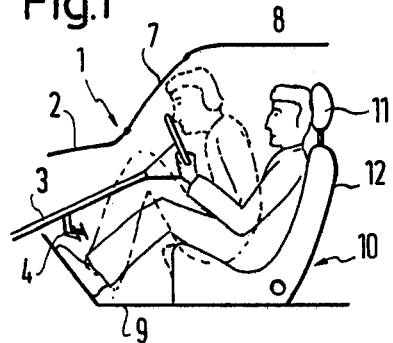
FIG. 1 is a side elevation of a conventional automobile seat.

FIG. 1 sketches a vehicle 1 having a fore-part 2 from where a steering column 3 and pedals 4 extend into the passenger room which is defined by a windscreen or shield 7, by a roof 8 and by a bottom 9. A seat 10 is mounted to the bottom 9 so as to allow longitudinal adjustment. The seat 10 has a headrest 11 and a back 12 pivotable with respect to the seat base. Full lines show a driver in his or her normal position. Broken lines indicate an accidental position when the person's body sliding forward under the force of sudden deceleration has been flung onto the steering wheel.

Figure 2:
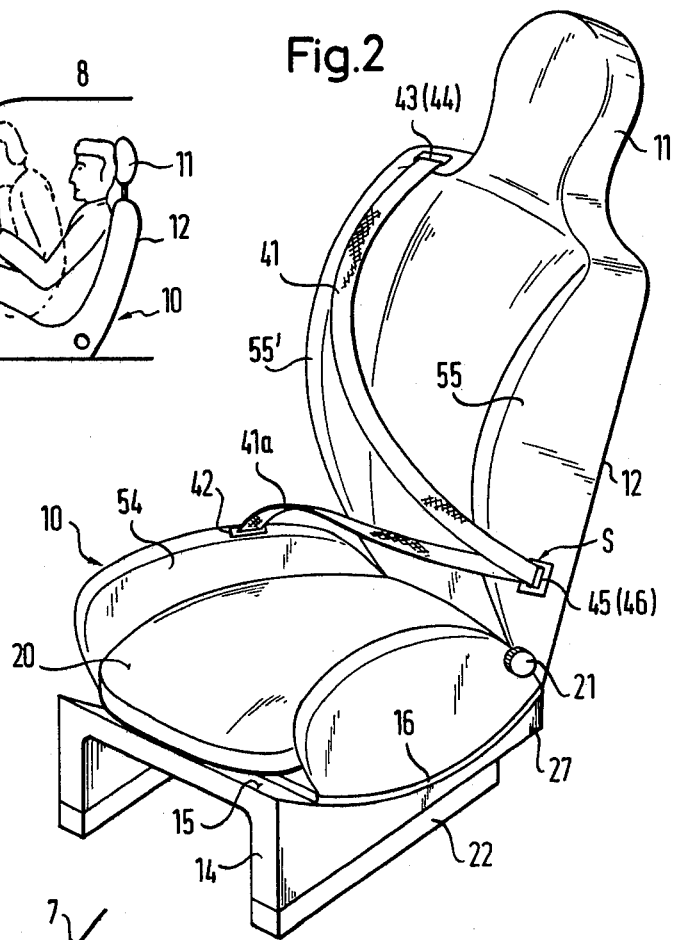
FIG. 2 is a simplified perspective view of a seat system according to the invention.

Such accidental movements will be prevented by a seat system as shown in FIG. 2 wherein the seat base includes a support 14 movably fixed to longitudinal slide rails 22 by conventional means. The upper side of the support 14 forms a downwardly concave sliding plate 15 on top of which a sliding block 16 supports the seat proper designated by reference numeral 20. Together, sliding plate 15 and sliding block 16 comprise a cup-type or sole bearing that warrants that the sliding block 16 is forcibly moved to the front and upwardly only when an excessive deceleration takes place, e.g., in case of a collision, whereby the entire seat is pivoted approximately in the direction of impact, including the occupant who is fastened thereto by means of a three-point belt. A lap strap 41a is attached to a belt fastener 42 at a side piece 54 of the seat 10. A shoulder strap 41 issues at a belt take-off 43 in the upper part of seat back 12 which also houses a belt retardation device 44 (not shown in detail). A belt coupling element S extends into a release device 45 that is arranged in the lower part of a side piece 55, along with a belt tightener 46 (not shown in detail). Much as in conventional passive retaining systems, the members 45 and 46 may also be situated at other parts of vehicle 1, e.g., at an adjacent door.

The rear portion of the support 14 houses a drive means 27 which may be a hydraulic cylinder, a bursting jack or the like and which will be operated in an emergency by a trigger or release device (not shown here) so as to push the sliding block 16 forward on the sliding plate 15, pivoting the seat 10.

Figure 3:
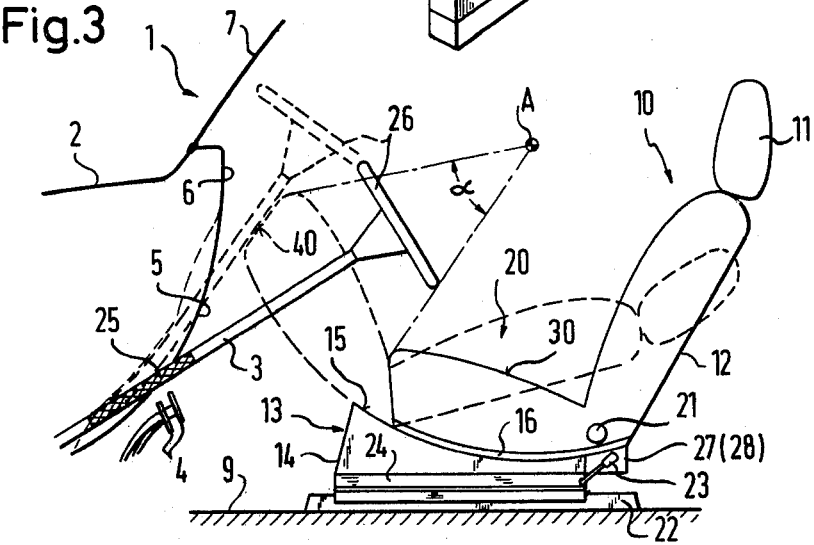
FIG. 3 is enlarged size elevation of a seat system according to the invention.

A suitable arrangement is shown in FIG. 3 wherein the basic design includes a frame or base 13, a support 14 having bottom guide rails 24 at both sides for cooperation with slide rails 22 fixed to the vehicle bottom 9. A positioning lever 23 serves to arrest the rails in their respective position or to release them for readjustment. The angle of inclination of the back 12 in respect of the seat bottom 20 is controlled by an adjusting knob 21.

It will be seen from FIG. 3 that the tilting motion of the sliding block 16 on the sliding plate 15 around an imaginary axis A will correspond to an angle $\alpha$ that may preferably extend to about 45°. Prior to this pivoted position shown by broken lines, the reinforced front edge 40 of the seat 10 will engage the steering column 3 that has a deformable or crushable portion 25 which will, therefore, be bent upwardly and absorb shock energy thereby. In his or her final position, the belt-fastened passenger will lie rather than sit, as the buttocks and thighs are pressed onto the seat bottom in the direction nearest to the line of impact and the legs are cushioned by the padding 5 that is joined to the dashboard 6 and the adjacent lower vehicle body sections.

In order that the drive means 27 which assist in tilting the seat 10 cannot be actuated prematurely, a locking device 28 (not shown in detail) is provided. It may be of the mechanical type featuring a predetermined breaking point where a locking element will suddenly break when an excessive inertia force is exerted.

Figure 4:
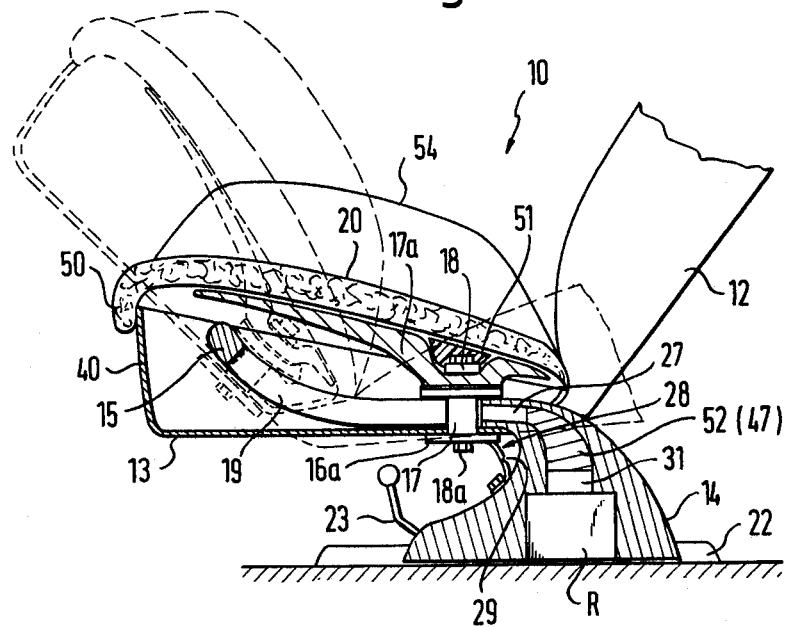
FIG. 4 is a longitudinal section through parts of another seat embodiment.
Figure 5:
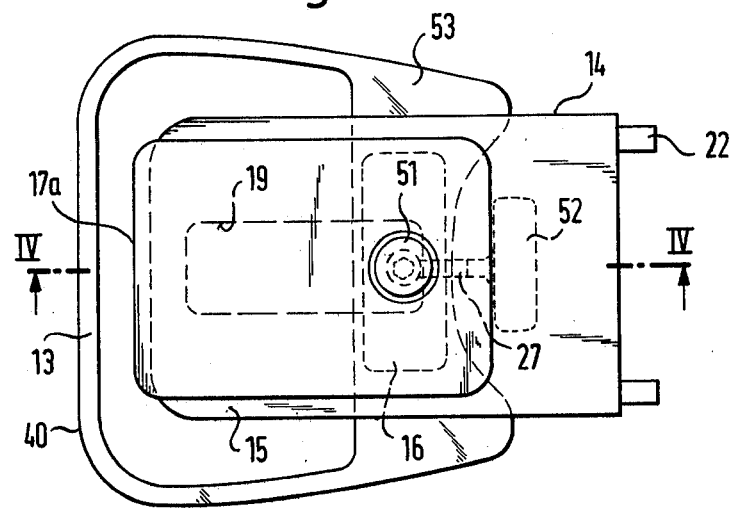
FIG. 5 is a top view of the seat of FIG. 4.

The seat embodiment shown in FIGS. 4 and 5 comprises a frame or base 13 connected to the support 14 by means of the upwardly concave sliding members 15 and 16. The sliding block 16, 16a contains a central support 17 fixing a flat extension 17a by a thrust piece 18 and a thrust bolt 18a. An upholstering 50 is supported by the flat extension 17a; it may consist of a cushion made up of two foamed layers of different properties and may cover a pillow 51 that guarantees an even support of the upholstering 50 at the recess, too, that is provided for receiving the mounting means securing the flat extension 17a. Between the latter and the seat proper 20, there may be a shock energy absorber made of expanded metal.

Further in FIGS. 4 and 5, it will be evident that the sliding plate or pivoting face 15 has a central aperture 19 wherein the central support 17 is adapted to be moved as soon as the locking element, when breaking at its rated break point, will permit the shifting of the sliding block 16, 16a whose curvature in a direction transverse to the line IV—IV in FIG. 5 is preferably the same as that of the sliding plate 15. Consequently, the seat 10 may also tilt sidewise in case of a lateral or oblique crash. The aperture 19 may, therefore, be shaped so as to allow sidewise pivoting of the seat 10 to a larger extent. FIG. 6b shows an embodiment wherein a distended recess 19a in a generally pear-shaped aperture 19 will increase the lateral pivoting range.

As mentioned above, the drive means 27 may comprise a hydraulic or explosive unit backed up by structural elements (not shown) in a duct chamber 52 that may be filled with suitable material. The drive means 27 is actuated by a trigger or release device 31 with an inertia-operated control element such as a snap or catch pendulum or any other threshold-responding mechanism. For mounting the parts 27, 47, 52, 31 and possibly also the locking device 28, a detachable box R is provided within the foot of the support 14.

The extreme pivoted position of the seat 10 is indicated by broken lines in FIG. 4. In this position, too, all normal adjustments of the seat 10 are feasible in the same way as in the standard position shown by full lines.

The frame 13 of the seat base comprises a rear bracket 53 (FIG. 5) rigidly connected to or integral with the lower part of the sliding block 16a. The locking device 28 may be secured by the thrust bolt 18a, too; a similar mounting means may retain the other end of the locking device 28 at the foot of the support 14.

Figure 6A:
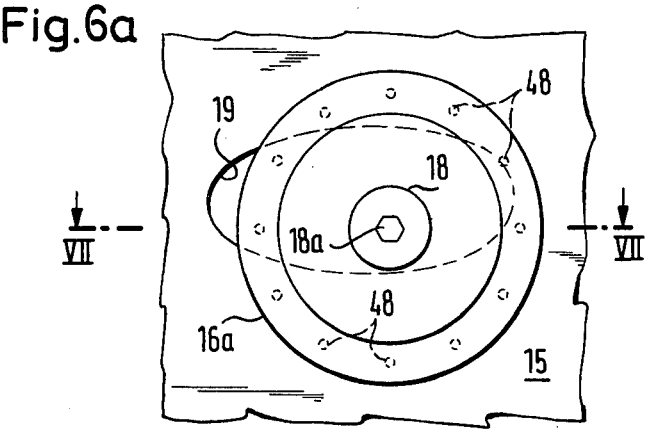
FIG. 6a is a bottom viw of a sliding device.
Figure 6B:
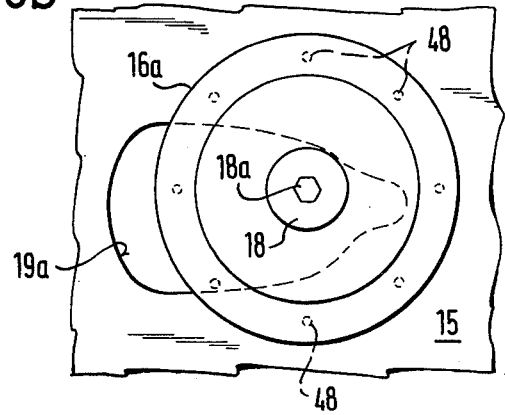
Figure 7:
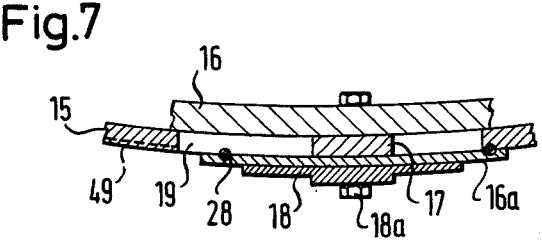

Details of a sliding arrangement for a seat system according to the invention may be taken from FIGS. 6a, 6b, and 7. The sliding plate or track face 15 may be an upwardly hollow cap whose shape is identical with or at least largely matched by the complex sliding block 16. The central support 17 and the thrust plate 16a of the latter are held to the underside of the sliding plate 15 by the flange-like thrust piece 18. As described above, the drive means 27 may be suitably arranged to engage the parts mentioned. Between the members 15, 16, 16a and 17 which form the cup-type or sole bearing for the seat 10, recesses 48 may be provided for receiving locking balls (28 in FIG. 7) allowing the sliding block 16, 16a to move relative to the sliding plate 15 only if and when an inertia threshold has been exceeded. In order to facilitate further motion, it is possible to provide, e.g., in the sliding plate 15, grooves 49 which assist in the relative shifting of the cup-type bearing parts at least in a given direction, preferably in the longitudinal vehicle direction.

Figure 8:
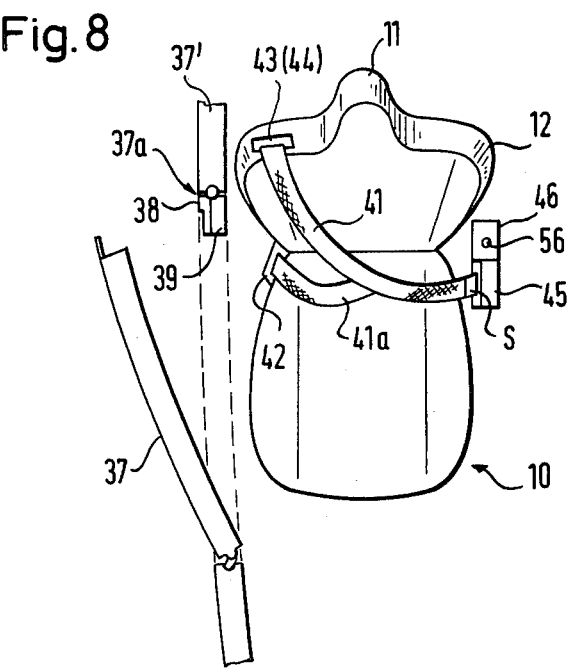
FIG. 8 is a simplified top perspective view of another seat embodiment.

Another embodiment of a seat system 10 is depicted in FIG. 8 which is reduced to the elements deemed indispensable. However, the expert will take it from FIG. 8 that the seat may be arranged adjacent a door 37 to be closed at a door post 37a carrying a door sensor 38 which may be provided with an unlocking device 39. These members 38 and 39 serve for enabling the seated occupant to have himself or herself pivoted by closing the door 37 or the next door 37'.

Figure 9:
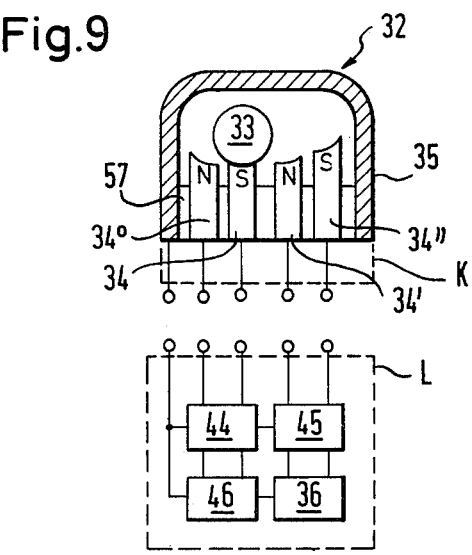
FIG. 9 is a partly sectional diagrammatic view of a threshold control switch.

In addition or selectively, the embodiment of FIG. 8 also provides for initiating the seat pivoting motion as soon as the belt system 41, 41a has tightly fastened the seated person. Again, a three-point belt may be used which is attached at the fastener 42, at the take-off 43 (including retardation device 44) and at the coupling elements S and 45, 46. The belt tightener 46 is actuated, for example, by the first stage of a double-acting button switch 56 whose second stage serves to trigger the drive system 27.

Where the tilting of the seat 10 is to be effected through inertia forces only, a threshold control will be required such as the embodiment shown in FIG. 9. A switch 32 houses a contact ball 33 made of electrically or magnetically conductive material. It rests on one of a series of detents 34°, 34, 34', 34" which are made of alternately poled bar magnets and which have hollow upper faces of varying inclination. Thus the ball 33 originally held to one of the detents, e.g., to the lowermost detent 34, will roll over to the next detent under the influence of an inertia force that exceeds the retaining strength. At the same time, the ball 33 will effect at least one contacting or switching operation by means of suitable members that may be magnetic or magnetically permeable so that magnetic circuits will be closed or opened, respectively. It will be seen from FIG. 9 that electrical contacts K may be used which are conductively joined to each of the detents 34°, 34, 34', 34" on the one hand and to electrical devices of a printed circuit board L on the other hand, for instance through connectors with or without cord leads. It is thus possible to immediately actuate suitably designed components such as the members 44, 45, and 46 as well as an ignition switch 36 for the drive means 27, once the ball 33 establishes the respective contact or contacts.

It will be noted that the diagrammatic view of FIG. 9 merely indicates such contacting, leaving it to the expert how to actually construct a threshold control 32 for obtaining electrical and/or magnetic contacting or switching operations, if by conventional means.

Yet another embodiment of the invention provides for a limited translatory movement of the base 13, the support 14 and/or of the cup-type bearing 15, 16 against a progressive resistance means (not shown), preferably in a direction parallel to the vehicle bottom 9 along the rails 22, 24. In this way, the stress to which each of the seated persons is subjected in case of a crash or sudden deceleration beyond the given threshold may be further eased and prolonged until after the standstill of the vehicle 1.

While the principles of the invention have been described above with reference to specific examples, it is to be clearly understood that this description may not be construed as a limitation to the scope of the invention as set forth in the objects thereof and in the accompanying claims.

I claim:

1. A safety seating arrangement for motor vehicles comprising in combination:
    (a) a seat having a safety belt associated therewith,
    (b) a supporting base for said seat,
    (c) a first sliding member attached to the bottom of said seat, said first sliding member being convex in a downward direction,
    (d) a second sliding member attached to an upper portion of said supporting base, said second sliding member being concave in an upward direction, said first and second sliding members both having smooth-faced matching surfaces so as to permit sliding movement therebetween,
    (e) driving means for rapidly moving said first sliding member relative to said second sliding member so that the seat can assume an inclined safety position,
    (f) means for activating said driving means, and
    (g) braking means for progressively retarding said first and second sliding members when moved relative to each other.

2. An arrangement according to claim 1, wherein said braking means comprises deformable sections in at least one of said sliding members.

3. An arrangement according to claim 1, wherein the extent to which said first sliding member can slide relative to said second sliding member is limited by a central support means which is secured to said first sliding member so as to extend through a slot in said second sliding member and which is adapted to be movable within said slot in said second sliding member.

4. An arrangement according to claim 3, wherein said first sliding member is held in sliding engagement with said second sliding member by said central support means comprising a sliding block that is attached to said seat so as to sandwich said second sliding member between said sliding block, which extends downwardly through said slot, and an opposite plate member secured to said sliding block.

5. An arrangement according to claim 1, which includes locking means to lock said first and second sliding means relative to each other, said locking means being adapted to be released by disengaging means.

6. An arrangement according to claim 5, wherein said disengaging means includes deceleration sensing means and threshold release means such that said locking means is automatically disengaged by said threshold release means when the vehicle deceleration sensed exceeds a predetermined threshold value.

7. An arrangement according to claim 6, wherein said deceleration sensing means includes inertia-operated an control element.

8. An arrangement according to claim 5, wherein said locking means comprises a plurality of balls imbedded under force-fit between said first and second sliding members.

9. An arrangement according to claim 8, wherein said plurality of balls is seated in grooves on said sliding members so as to permit restrained movement of said balls in said grooves upon release of said locking means.

* * * * *